US007227763B1

(12) United States Patent
Noh et al.

(10) Patent No.: US 7,227,763 B1
(45) Date of Patent: Jun. 5, 2007

(54) POWER SUPPLY APPARATUS USING HALF-BRIDGE CIRCUIT

(75) Inventors: Si Youl Noh, Yangju-si (KR); Min Sung Yang, Seoul (KR)

(73) Assignee: AVERD Co., Ltd., Goyang-si, Gyeonggi-do (KR)

( * ) Notice: Subject to any disclaimer, the term of this patent is extended or adjusted under 35 U.S.C. 154(b) by 0 days.

(21) Appl. No.: 11/459,621

(22) Filed: Jul. 24, 2006

(51) Int. Cl.
*H02H 7/122* (2006.01)
*H05B 37/02* (2006.01)

(52) U.S. Cl. ...................... 363/56.02; 363/98; 315/307

(58) Field of Classification Search .................. 363/16, 363/17, 56.02, 58, 98, 132; 327/108, 112; 315/224, 307
See application file for complete search history.

(56) References Cited

U.S. PATENT DOCUMENTS

| | | | | |
|---|---|---|---|---|
| 6,002,213 A * | 12/1999 | Wood | ......................... | 315/307 |
| 6,087,782 A * | 7/2000 | Majid et al. | ................ | 315/224 |
| 6,154,375 A * | 11/2000 | Majid et al. | .................. | 363/16 |
| 6,486,714 B2 * | 11/2002 | Ushida et al. | .............. | 327/108 |

* cited by examiner

*Primary Examiner*—Adolf Berhane
(74) *Attorney, Agent, or Firm*—JHK Law; Joseph Hyosuk Kim

(57) ABSTRACT

Disclosed is a power supply apparatus using a half-bridge type driving circuit, which is intended for the purpose of the compensation of a power factor, the achievement of a low crest factor and the maintenance of a constant output. The power supply apparatus using a half-bridge circuit for rectifying an AC power source and providing the rectified power source to a load includes a line voltage detecting means for detecting a voltage of an input power source provided to the load, an error amplifying means for comparing the voltage detected from the line voltage detecting means with a reference voltage and outputting a voltage corresponding to a difference therebetween, a pulse width modulating means for outputting a pulse having a variable width corresponding to an output level of the error amplifying means, a dead time controlling means for outputting a first pulse corresponding to a high side and a second pulse corresponding to a low side by the pulse output from the pulse width modulating means, wherein the first and second pulses have different pulse widths and different rising and falling time points, and a driving means for driving the power source supplied to the load as a constant current state by the first and second pulses.

12 Claims, 21 Drawing Sheets

(B) EA OUTPUT WAVEFORM

POWER SUPPLY APPARATUS USING HALF-BRIDGE CIRCUIT

BACKGROUND OF THE INVENTION

1. Field of the Invention

The present invention relates to a power supply apparatus using a half-bridge circuit, and more particularly to a power supply apparatus using a half-bridge type driving circuit, which is intended for the purpose of the compensation of a power factor, the achievement of a low crest factor and the maintenance of a constant output by being applied to a ballast or an inverter.

2. Background of the Related Art

Generally, an electronic ballast or an inverter used in a lamp converts a commercial power frequency into a high frequency and serves as controlling current so as to prevent over-current from flowing. The ballast may use various types of power factor compensation circuits in order to reduce current consumption, extend life span, and improve product reliability.

For example, a diode power factor compensation circuit may be used to vary a frequency as a method for accomplishing a high power factor and a low crest factor.

Although this method can achieve a high power factor and a low crest factor at low cost without using a dedicated integrated circuit (IC) of high cost for power factor compensation, there are problems due to a wide frequency variable range.

Specifically, if a frequency is raised, the efficiency of a resonance circuit deteriorates and thus the efficiency of the ballast is lowered. A wide frequency bandwidth increases an electro-magnetic interference (EMI) noise. In addition, a high frequency causes an increase in a power loss of a switching device and an increase in energy supplied to a filament, thereby shortening the life of a lamp tube and lowering the efficiency of the ballast.

If it is desired to control an output by varying only a frequency, since an output control dynamic characteristic is low, it is very difficult to set a feedback circuit for control. Moreover, since the overall characteristics of the ballast are poor, it is difficult to actually use the diode power factor compensation circuit.

Especially, when an input voltage is varied, since there are wide variations in power consumption, a crest factor, filament power, etc., a big difference occurs between a target characteristic value and an actual value.

Meanwhile, the use of the dedicated IC for power factor compensation, instead of the diode power factor compensation circuit, leads to an economic burden of cost, and an increase in the number of components and in size.

SUMMARY OF THE INVENTION

Accordingly, the present invention has been made in view of the aforementioned problems occurring in the prior art, and it is an object of the present invention to provide a power supply apparatus using a half-bride circuit usable in a ballast or an inverter, capable of improving an output control dynamic characteristic by varying a frequency and controlling a pulse width.

It is another object of the present invention to provide a power supply apparatus using a half-bridge circuit usable in a ballast or an inverter, capable of achieving a high power factor, a constant output and a low crest factor characteristics without using an additional high power factor circuit.

It is still another object of the present invention to provide a power supply apparatus using a half-bridge circuit usable in a ballast or an inverter, capable of raising power efficiency, extending the life of a lamp tube, and improving light conversion efficiency.

To accomplish the above objects, according to an aspect of the present invention, there is provided a power supply apparatus using a half-bridge circuit for rectifying an alternative current (AC) power source and providing the rectified power source to a load, including a line voltage detecting means for detecting a voltage of an input power source provided to the load, an error amplifying means for comparing the voltage detected from the line voltage detecting means with a reference voltage and outputting a voltage corresponding to a difference therebetween, a pulse width modulating means for outputting a pulse having a variable width corresponding to an output level of the error amplifying means, a dead time controlling means for outputting a first pulse corresponding to a high side and a second pulse corresponding to a low side by the pulse output from the pulse width modulating means, wherein the first and second pulses have different pulse widths and different rising and falling time points, and a driving means for driving the power source supplied to the load as a constant current state by the first and second pulses.

The line voltage detecting means may include a low pass filter for smoothing the input power source and converting the smoothed input power source into a direct current (DC) voltage, and a line voltage detector for supplying an output signal to the error amplifying means if the voltage of the low pass filter is less than a prescribed level.

The line voltage detector may further generate an output signal having a logic value if the voltage of the low pass filter is more than a prescribed level.

The error amplifying means may include a comparator for comparing the voltage detected from the line voltage detecting means with a constant voltage, a voltage divider for adding an output of the comparator to a divided reference voltage, and an error amplifier for comparing a voltage provided by the voltage divider with a feedback voltage of a voltage supplied to the load and outputting a signal corresponding to a difference therebetween.

The voltage divider may receive a dimming control voltage instead of the reference voltage.

The power supply apparatus may further include a voltage controlled oscillator for providing a variable frequency corresponding to an output level of the error amplifying means to the pulse width modulating means, wherein the pulse width modulating means may generate a pulse having a frequency of a signal provided by the voltage controlled oscillator and a variable pulse width corresponding to the output level of the error amplifying means.

The power supply apparatus may further include a soft start timer for controlling the voltage controlled oscillator and the error amplifying means during initial starting, controlling an output to be a high frequency and a maximum pulse width during initial power source supply, gradually lowering a frequency, and stopping an operation after a given time elapses.

The dead time controlling means may include a first delay for outputting the first pulse applying a first dead time by delaying a rising time point of an output of the pulse width modulating means by a given time, and a second delay for outputting the second pulse applying a second dead time by inverting the output of the pulse width modulating means and then delaying a falling time point of the inverted signal by a given time.

The driving means may include a high side driver for outputting a high side driving signal by the first pulse, a low side driver for outputting a low side driving signal by the second pulse, a first switching device for switching the high side of the AC power source supplied to the load by an output of the high side driver, and a second switching device for switching the low side of the AC power source provided to the load by an output of the low side driver.

The power supply apparatus may further include a high power factor circuit for controlling a power factor of the input power source provided to the load, and the load may be a cold cathode fluorescent lamp (CCFL).

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiment of the present invention with reference to the attached drawings.

A power supply apparatus according to a preferred embodiment of the present invention has a configuration that varies a frequency and controls a pulse width. Namely, a pulse width of a signal provided to a load is varied depending on whether a voltage supplied from a power source is high or low and alternatively a frequency of the signal provided to the load may be simultaneously varied. Then a constant output is supplied to the load.

Figure 1:
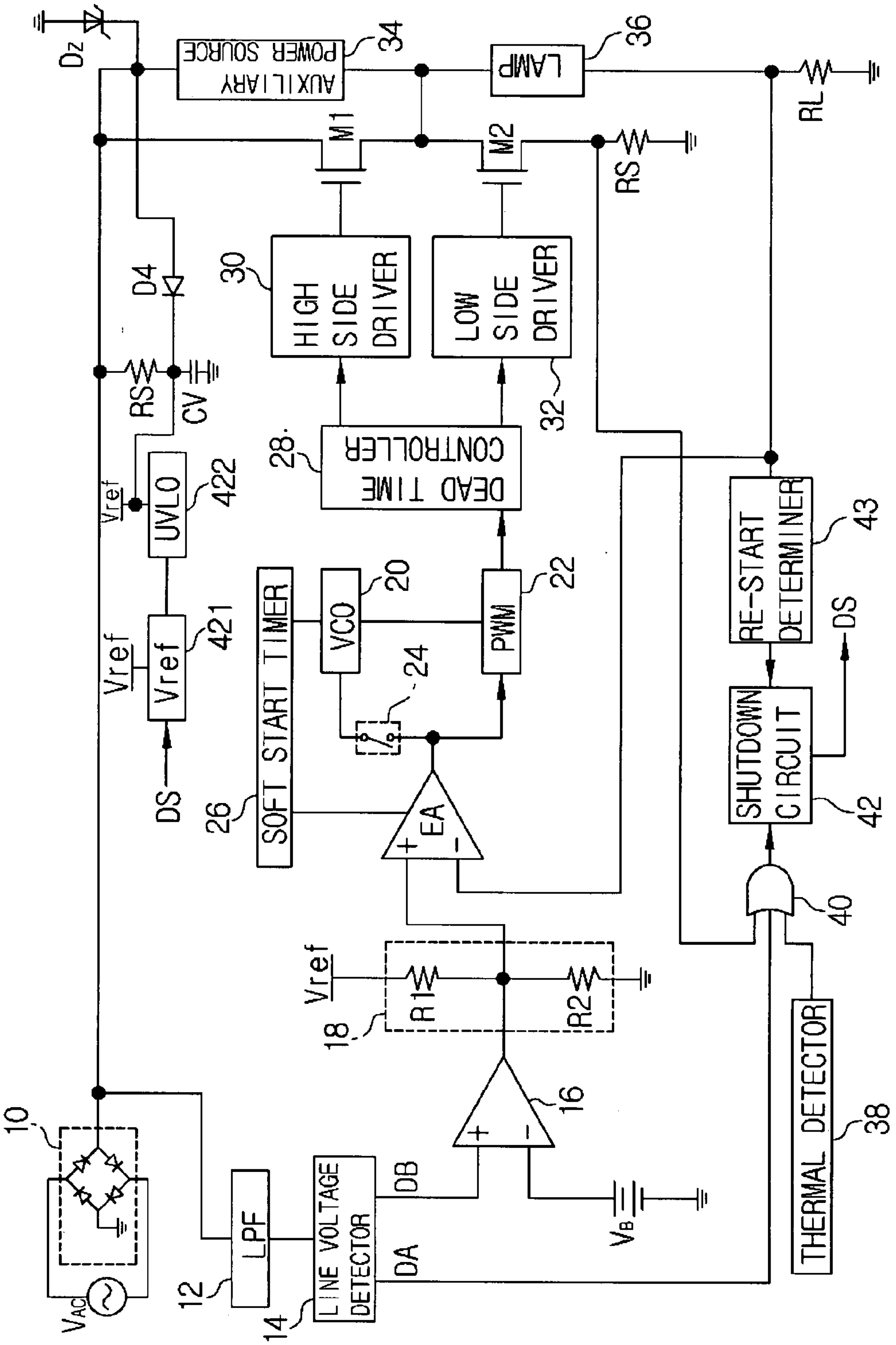
FIG. 1 is a circuit diagram illustrating a power supply apparatus using a half-bridge circuit applied to a ballast according to a preferred embodiment of the present invention.

FIG. 1 illustrates a power supply apparatus using a half-bridge circuit applied to a ballast according to a preferred embodiment of the present invention. Referring to FIG. 1, a rectifier circuit 10 includes four bridge coupled diodes and full-wave rectifies an alternative circuit (AC) power source $V_{AC}$.

The output of the rectifier circuit 10 is provided to a path for driving a lamp 36 that is a load of the rectifier circuit 10 and to a control path for maintaining an output supplied to the load constant.

To drive the load, that is, the lamp 36, the output of the rectifier circuit 10 is provided to a high side transistor M1 connected serially to a low side transistor M2. The high side transistor M1 and the low side transistor M2 are alternately switched and supply current provided from the rectifier circuit 10 to the lamp 36. A power supplied to the lamp 36 is controlled by controlling switching times of the high and low side transistors M1 and M2.

A configuration for controlling the switching of the high and low side transistors M1 and M2 corresponds to the control path for maintaining the output supplied to the load constant.

A node is formed between the high and low side transistors M1 and M2. A connection node between an auxiliary power source 34 and the lamp 36 that are connected in series is connected to the node between the high and low side transistors M1 and M2. A load resistor RL for detecting the amount of current supplied to the lamp 36 by a voltage is connected between the lamp 36 and a ground. A sensing resistor RS for detecting the amount of current flowing into the low side transistor M2 by a voltage is connected between the low side transistor M2 and a ground.

A reference voltage (Vref) circuit 421 for inputting an output DS of a shutdown circuit 42 and controlling the activation a reference voltage Vref, a under-voltage lock-out (UVLO) circuit 422, a re-start resistor RS, a capacitor CV, a backward connected diode D4, and a Zener diode DZ are constructed toward the auxiliary power source 34. The diode D4 and the Zener diode DZ control a back electromotive force and a ripple. The UVLO circuit 422 for implementing under-voltage lock-out starts activation at a high supply voltage (Vcc) during initial activation, and once activated, charges charged to the capacitor CV are instantaneously discharged. Then the Vcc may be lowered. In order not to affect a circuit operation even if the Vcc is instantaneously lowered, a voltage for stopping the circuit operation is set to be lower than a starting voltage by 1.5 to 2 voltages to facilitate the initial starting. Namely, the UVLO circuit 422 corresponds to a comparator having hysteresis.

Meanwhile, the output of the rectifier circuit 10 is provided to a low pass filter (LPF) 12 corresponding to the control path for maintaining the output supplied to the load constant.

The LPF 12 smoothes the AC voltage full-wave rectified by the rectifier circuit 10 and outputs a direct current (DC) voltage corresponding thereto. This DC voltage is supplied to a line voltage detector 14.

The line voltage detector 14 generates an output signal DA having a logic value and an output signal DB having a linear value.

In more detail, if an output of the LPF 12 is more than a prescribed level, the line voltage detector 14 generates the output signal DA for shutting down the entire circuit and supplies the output signal DA to a NOR gate 40. If the output of the LPF 14 is less than a prescribed level, the line voltage detector 14 supplies the output signal DB having a linear value to a positive terminal of a comparator 16.

Figure 2:
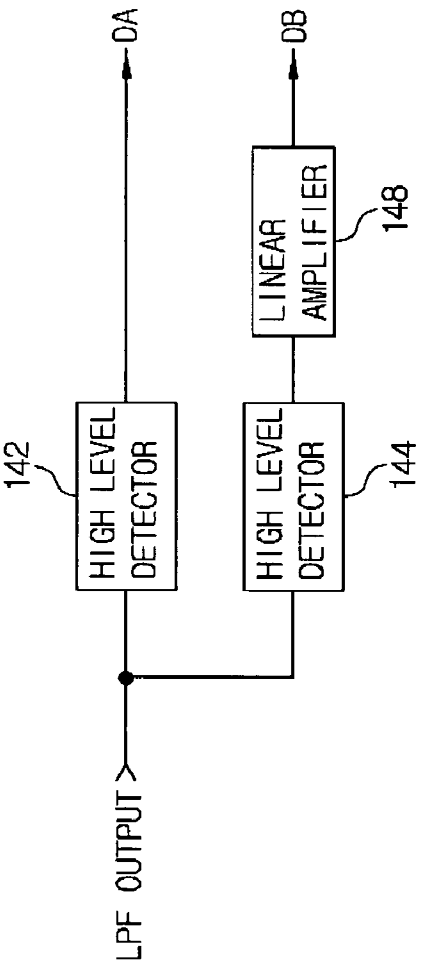
FIG. 2 is a detailed block diagram illustrating an example of the line voltage detector in FIG. 1.

A configuration of the line voltage detector 14 is illustrated in detail in FIG. 2. Referring to FIG. 2, the output of the LPF 12 is supplied to a high level detector 142 and to a low level detector 144. If an input voltage is more than a given level, the high level detector 142 outputs the signal DA corresponding thereto. If the input voltage is less than a given level, the low level detector 144 supplies the input voltage to a linear amplifier 148. Then the linear amplifier 148 generates the output signal DB controlled while maintaining a linear state of the input voltage.

By the output signal DB, the reference voltage provided by an error amplifier EA is gradually reduced, thereby reducing a power supplied to the load.

Referring back to FIG. 1, the comparator 16 receives a given voltage $V_B$ through its negative terminal. The comparator 16 compares the output signal DB of the line voltage detector 14 with the voltage $V_B$ and supplies an amplified result to a voltage divider 18.

The voltage divider 18 consists of resistors R1 and R2 connected in parallel to a node connected to a positive terminal of the error amplifier EA. The voltage divider 18 adds a divided reference voltage to the output of the comparator 16 and supplies the added result to the positive terminal of the error amplifier EA.

An operation of the error amplifier EA is controlled by a soft start timer 26. The error amplifier EA supplies its output to a voltage controller oscillator (VCO) 20 and a pulse width modulator (PWM) 22. A switch 24 operable by a user may be connected between the VCO 20 and the error amplifier EA so that the user can determine whether to vary a frequency.

Upon receipt of an output of the error amplifier EA, the VCO 20 outputs a frequency signal corresponding to a level of the input voltage and supplies the frequency signal to the PWM 22. If the output of the error amplifier EA is not received, the VCO 20 outputs a fixed frequency signal and supplies the fixed frequency signal to the PWM 22.

The PWM 22 outputs a pulse having a corresponding frequency by the frequency signal supplied from the VCO 20. The width of the pulse is variable according to a voltage level provided by the error amplifier EA.

Figure 3:
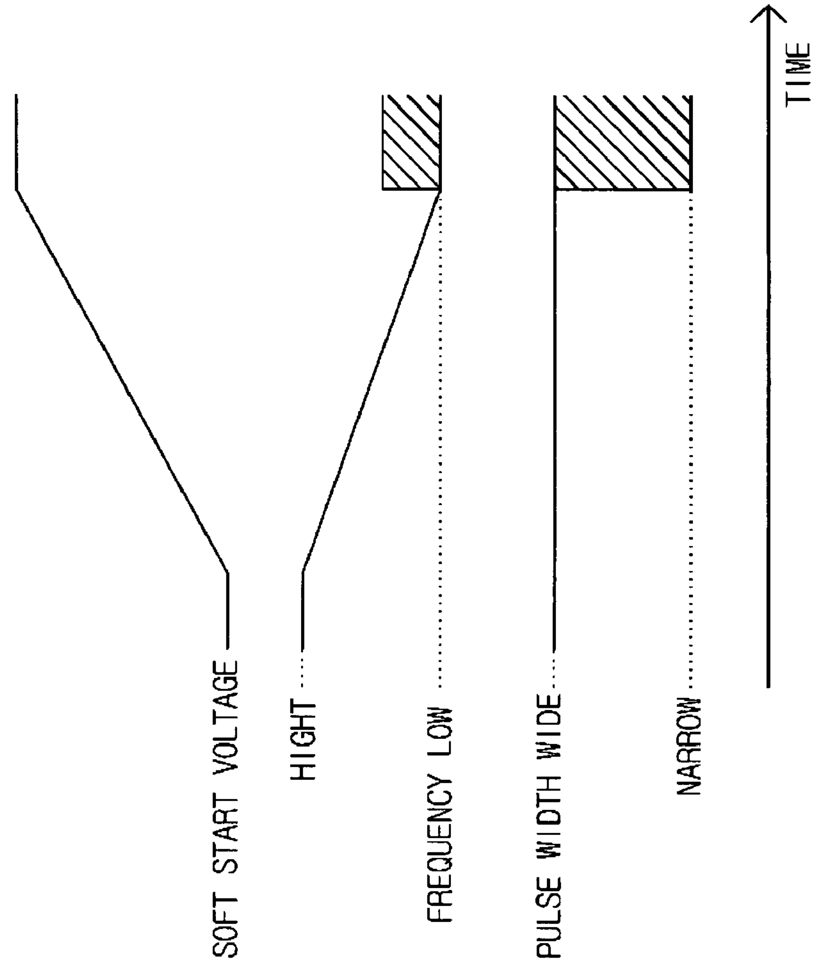
FIG. 3 is a waveform chart for describing the control of the soft start timer in FIG. 1.

The soft start timer 26 is a circuit for controlling a frequency in order to gradually transfer a power during initial starting. When a power source is initially applied, the soft start timer 26 controls an output to be a high frequency and maximum pulse width and then gradually lowers the frequency. After a given time elapses, an operation of the soft start timer 26 is stopped and a feedback circuit is operated. Then the entire closed circuit is controlled. The operational state of the soft start timer 4 is illustrated in FIG. 3.

On the other hand, a dead time controller 28 controls an output signal of the VCO 20 so as to have dead times d1 and d2 between a high side signal and a low side signal. The dead time controller 28 may be configured as shown in FIG. 4.

Figure 4:
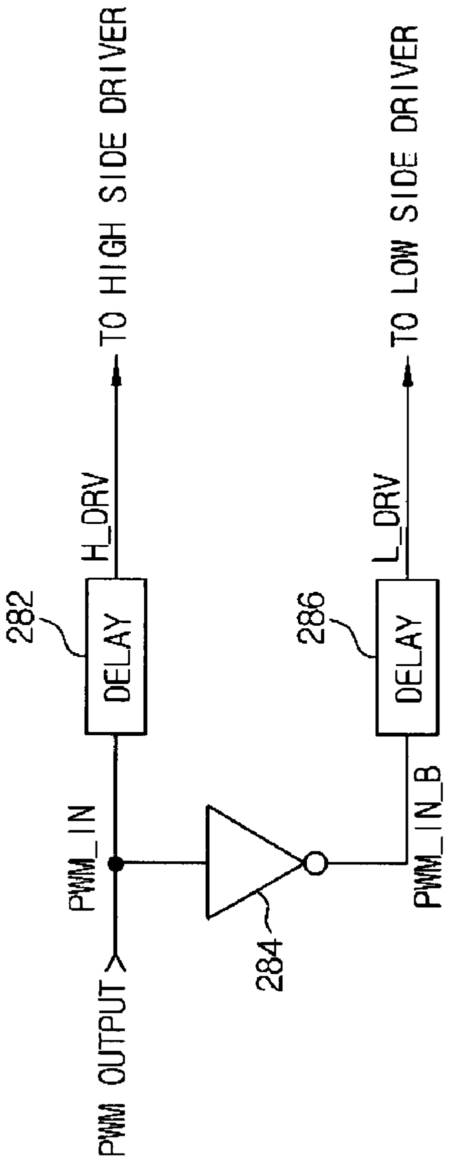
FIG. 4 is a detailed block diagram illustrating an example of the dead time controller in FIG. 1.

Referring to FIG. 4, the dead time controller 28 includes a delay 282 for delaying a rising time point of an output signal PWM_IN of the PWM 22 by d1, an inverter 284 for inverting the output signal PWM_IN of the PWM 22 and outputting an inverted signal PWM_IN_B, and a delay 286 for delaying a falling time point of an output of the inverter 284 by d2.

An operation of the dead time controller 28 will now be described with reference to FIG. 5A.

The PWM 22 triggers the frequency signal provided by the VCO 20 on the basis of the output of the error amplifier EA and outputs a pulse having a prescribed width. If the output level of the error amplifier EA is high or low, the PWM 22 outputs a pulse having a wide or narrow width corresponding thereto.

Figure 5A:
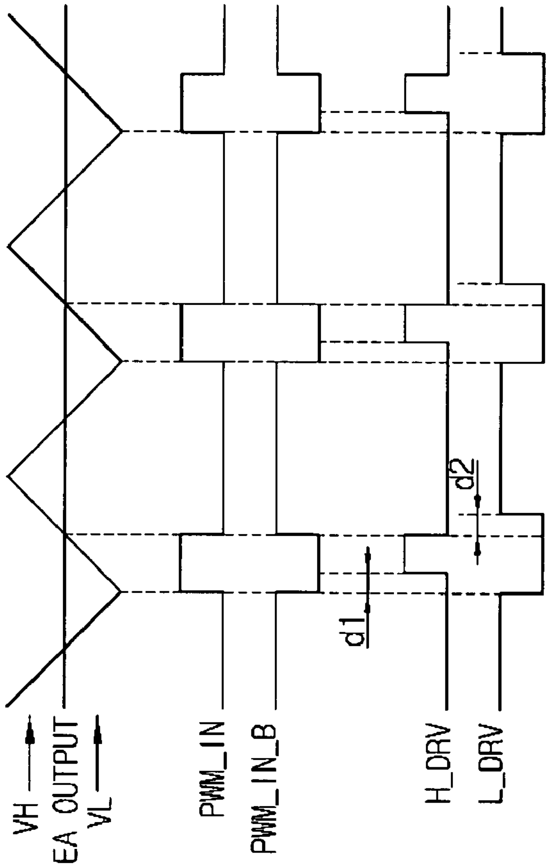
FIGS. 5A and 5B are waveform charts for describing an operation of the dead time controller in FIG. 4.
Figure 5B:
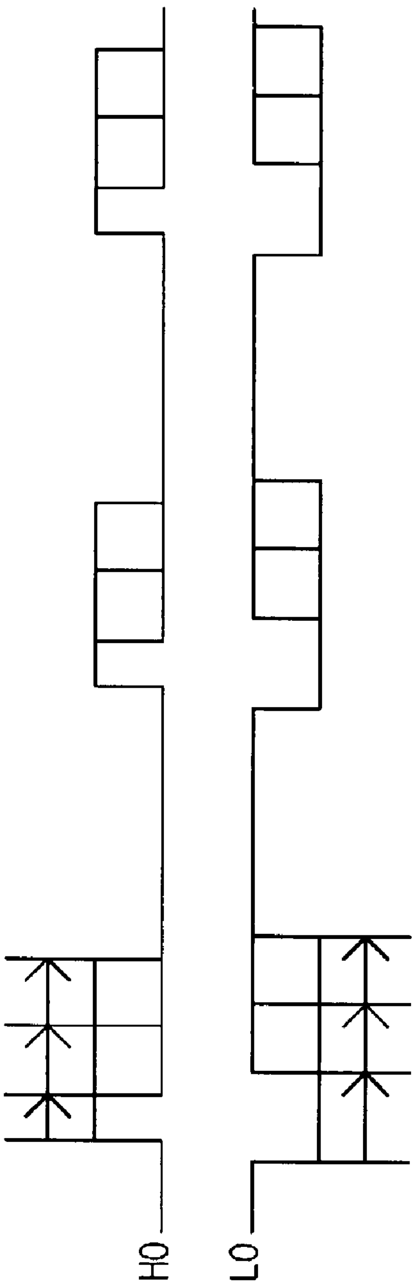

As illustrated in FIG. 5B, the PWM 22 varies the width of a high output pulse HO according to the output voltage of the error amplifier EA. In this case, a constant dead time should be maintained between high and low output pulses HO and LO.

Turning to FIG. 5A, the output PWM_IN of the PWM 22 is converted into a high side driving pulse H_DRV for driving a high side driver 30 by the delay 282. The rising time point of the pulse H_DRV is delayed by d1 as compared to that of the signal PWM_IN and their falling time points are the same.

The output PWM_IN of the PWM 22 is inverted to a signal PWM_IN_B by the inverter 284, and the inverted signal PWM_IN_B is converted to a low side driving pulse L_DRV for driving a low side driver 32 by the delay 286. The rising time points of the pulse L_DRV and the signal PWM_IN_B are the same and the falling time point of the pulse L_DRV is delayed by d2 as compared to that of the signal PWM_IN_B.

The delays 282 and 286 have delay times for determining the dead times d1 and d2 and may have the same or similar delay times.

Figure 6:
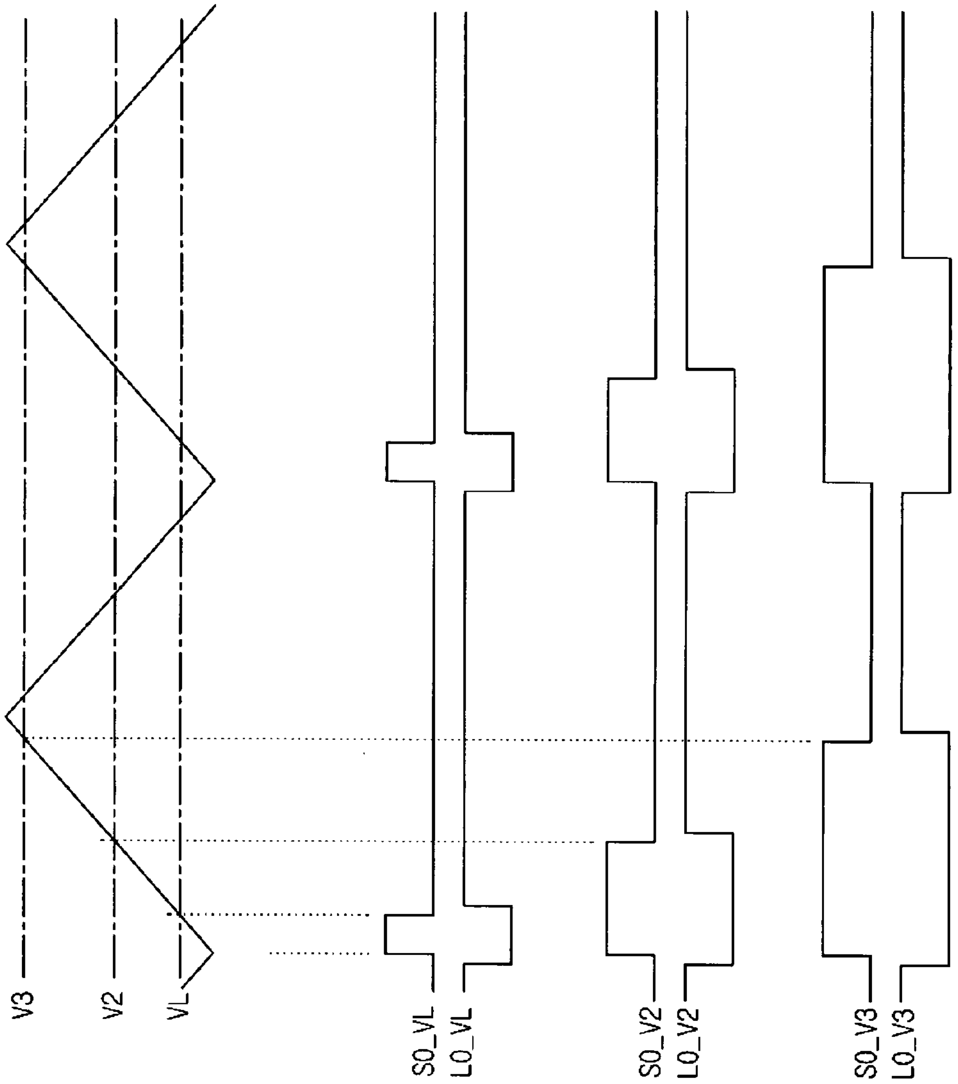
FIG. 6 is a waveform chart for describing a variation in a pulse width corresponding to a variation in an output level of the error amplifier in FIG. 1.

If the output of the error amplifier EA is variable from V1 to V3 as illustrated in FIG. 6, the dead time controller 280 outputs pulses corresponding to the output level of the error amplifier EA. At this time, even if a pulse width is varied, the dead times are the same.

The dead times are for maintaining a constant time interval in order to prevent the high and low side transistors M1 and M2 from being simultaneously turned on.

FIG. 6 illustrates variations in pulses output from the dead time controller 28 as the output of the error amplifier EA is varied in response to a fixed frequency.

If the current output from the rectifier circuit 10 is reduced and as a result an input voltage is lowered, an output control dynamic characteristic can be improved by varying a frequency as well.

Figure 7A:
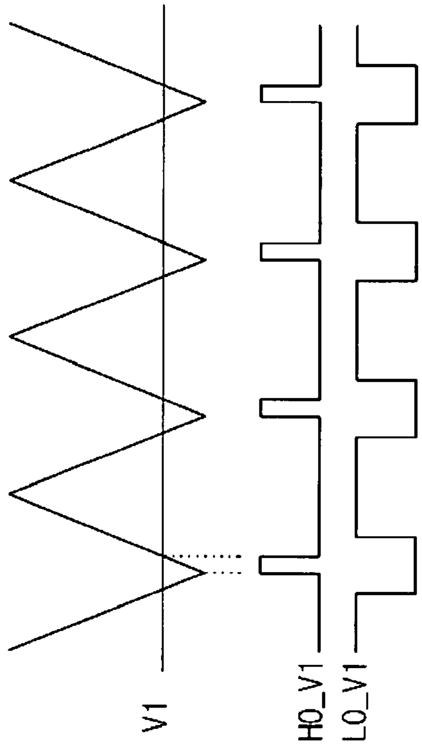
FIGS. 7A to 7D are waveform charts for describing a variation in a pulse width corresponding to a variation in a frequency and in an output level of the error amplifier in FIG. 1.
Figure 7B:
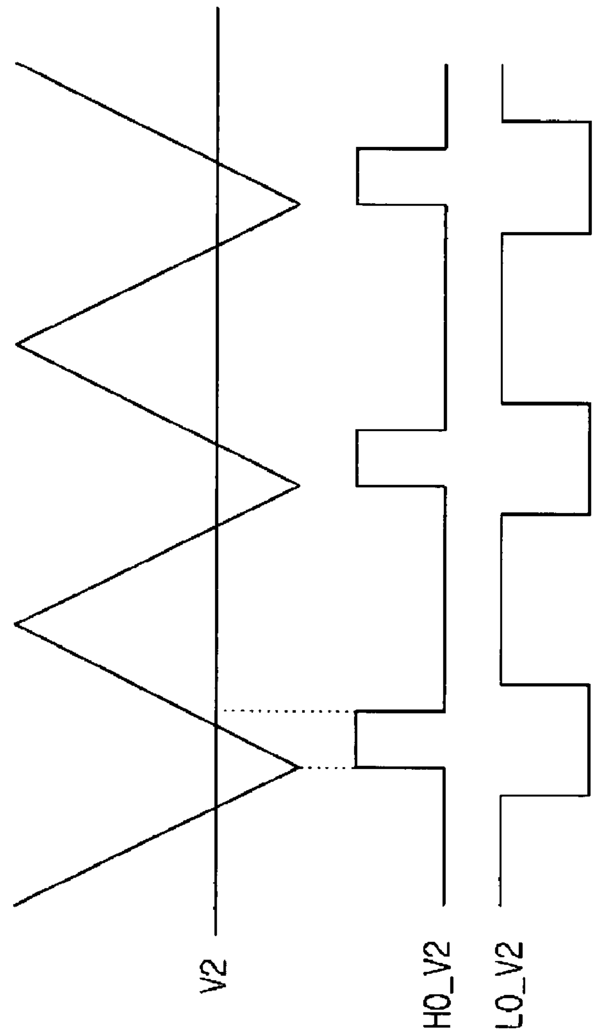
Figure 7C:
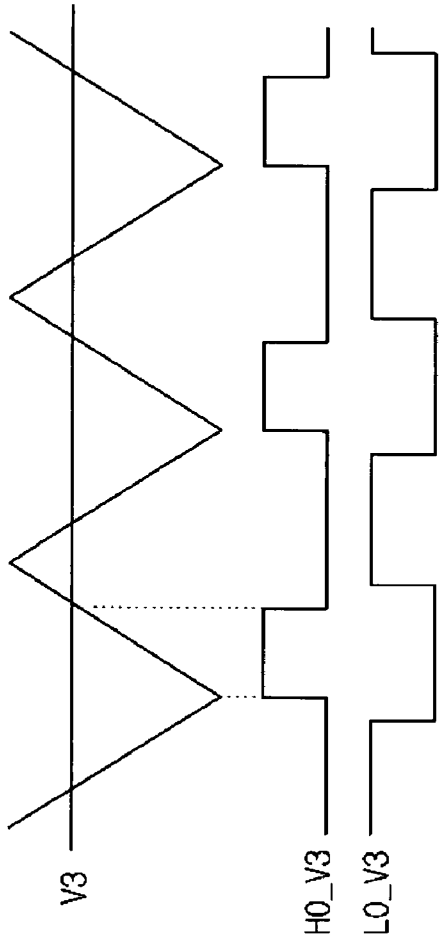

In more detail, a pulse can be controlled in various ways in response to variations both in a frequency and in the output of the error amplifier EA as illustrated in FIGS. 7A to 7C.

FIG. 7A shows a narrow pulse width corresponding to a high frequency and a low output of the error amplifier EA, FIG. 7B a middle pulse width corresponding to a middle frequency and a middle output of the error amplifier EA, and FIG. 7C a wide pulse width corresponding to a low frequency and a high output of the error amplifier EA. It is apparent in FIGS. 7A to 7C that a ratio of a high side pulse width to a low side pulse width differs according to the frequency.

The above-described pulses are input to the high and low side drivers 30 and 32. Then the high and low side transistors M1 and M2 are turned on at different time points, thereby maintaining a constant output in the lamp 36.

Figure 7D:
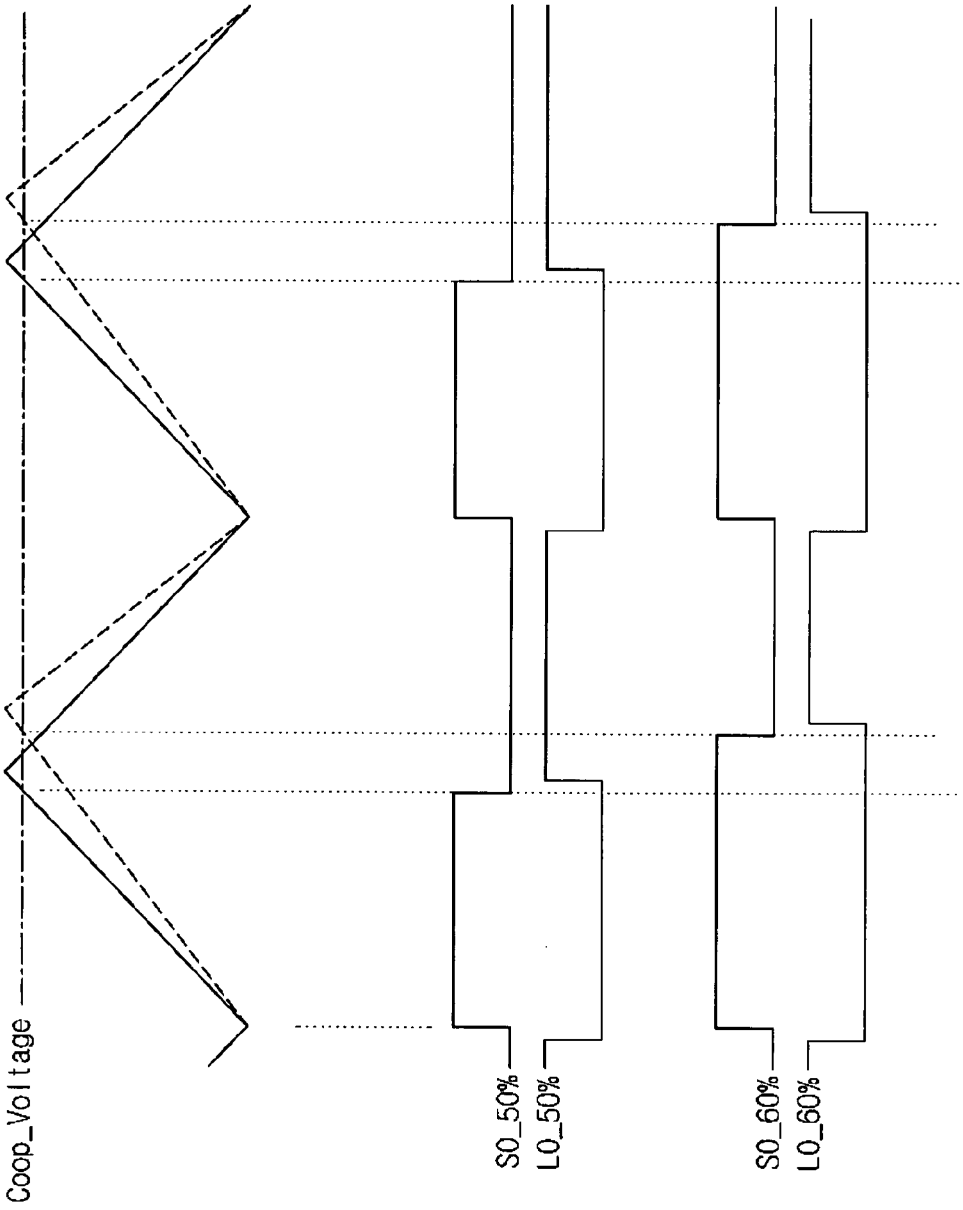

According to the present invention, a duty of a high side pulse of the half-bridge driving circuit is not fixed to 50 percent as in a general half-bridge circuit but varied according to circumstances to 50 percent or more or less, in order to effectively supply the power of the load even at a low AC line input voltage. The relationships between the high and low side pulses are shown in FIG. 7D.

As described above, if there is a variation in current flowing into the lamp 36, a load, from the rectifier circuit 10, the tuned-on times of the high and low side transistors M1 and M2 are varied and thus the maintenance of a constant output of the lamp 36 can be ensured.

Meanwhile, if over-current flows to the transistors due to a malfunction of the lamp 36, this is sensed by the sensing resistor RS and then an operation of the circuit may be stopped. This operation of the circuit is controlled by the shutdown circuit 42 receiving the output of the NOR gate 40. The Vref circuit 421 inactivates the Vref by the output DS of the shutdown circuit 42 to stop oscillation. Then the supply of the auxiliary power is stopped and no current is supplied to the load.

If ambient temperature is high, this is detected by a thermal detector 38 and the operation of the circuit may be stopped.

In addition, over-current flowing into the load due to a malfunction of the load is detected by the load resistor RL and a re-start determiner 43 provides a corresponding signal to the shutdown circuit 42. Thereafter, the operation of the circuit may be stopped.

Figure 8:
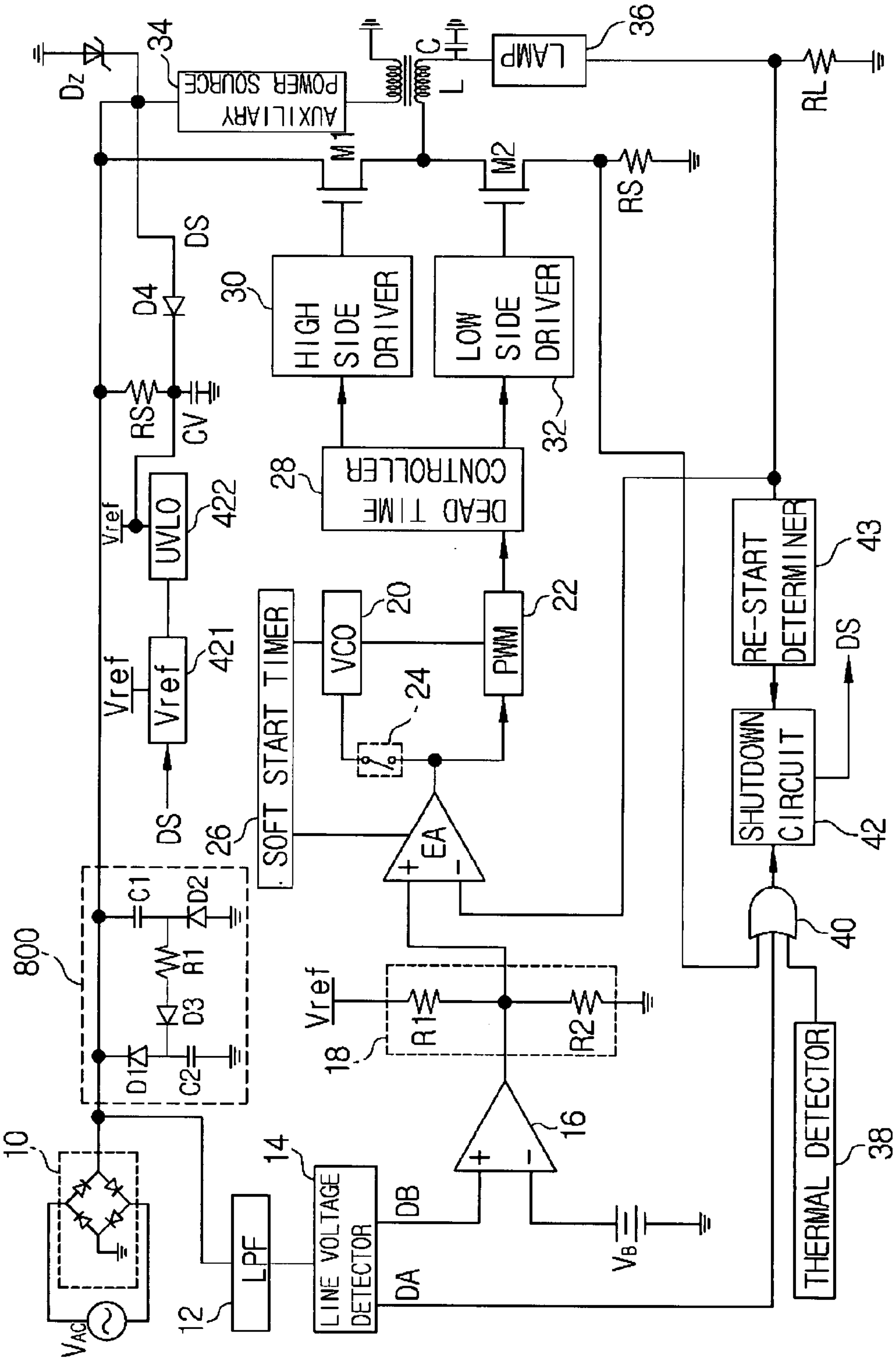
FIG. 8 is a circuit diagram a circuit diagram illustrating a power supply apparatus using a half-bridge circuit to which a simple high power factor circuit is applied according to another preferred embodiment of the present invention.

The above-described power supply apparatus according to the present invention may be applied to a ballast using a simple high power factor circuit of a rectifying type having a valley voltage as illustrated in FIG. 8.

A configuration of the power supply apparatus shown in FIG. 8 is the same as that shown in FIG. 1 except for a simple high power factor circuit 800 and elements of a load side. Therefore, a description of repeated construction and operation will be omitted. The simple high power factor circuit 800 including a plurality of diodes D1, D2 and D3, a plurality of capacitors C1 and C2, and a resistor R1 is well known to the art, and therefore a detailed description thereof will not be given.

Figure 9A:
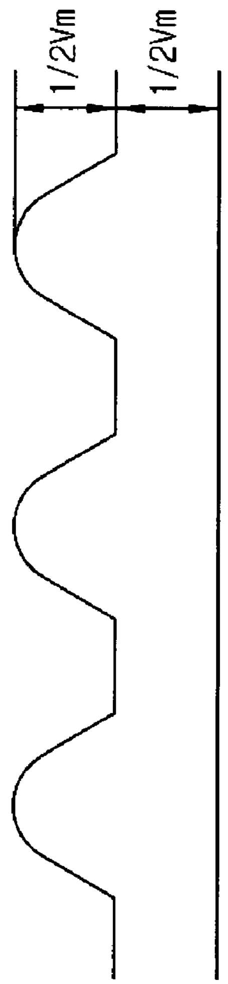
FIGS. 9A and 9B are waveform charts illustrating an output of the rectifier circuit in FIG. 8 and an output of the error amplifier corresponding thereto, respectively.
Figure 9B:
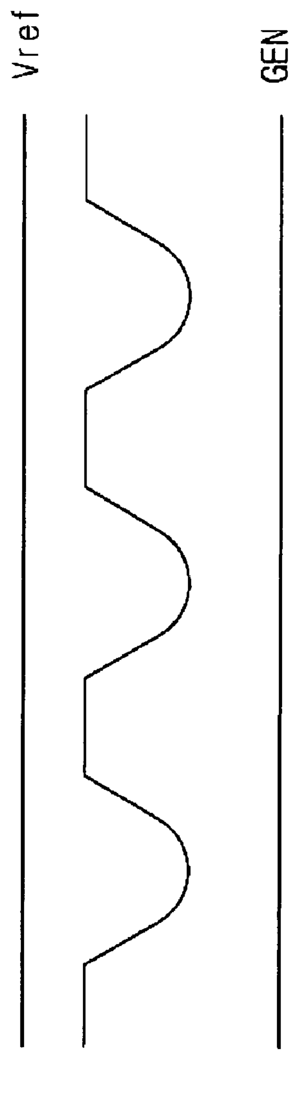

The output of the bridge diode 10 is as illustrated in FIG. 9A by the simple high power factor circuit 800 and the output of the error amplifier EA is as illustrated in FIG. 9B.

That is, during an interval of a high input voltage, a frequency is controlled to be high and a pulse width to be low. During an interval of a low input voltage, a frequency is controlled to be low and a pulse width to be high. Accordingly a constant output is maintained. In this case, the output voltage of the error amplifier EA is a reverse phase to an input as shown in FIG. 9B.

Figure 10A:
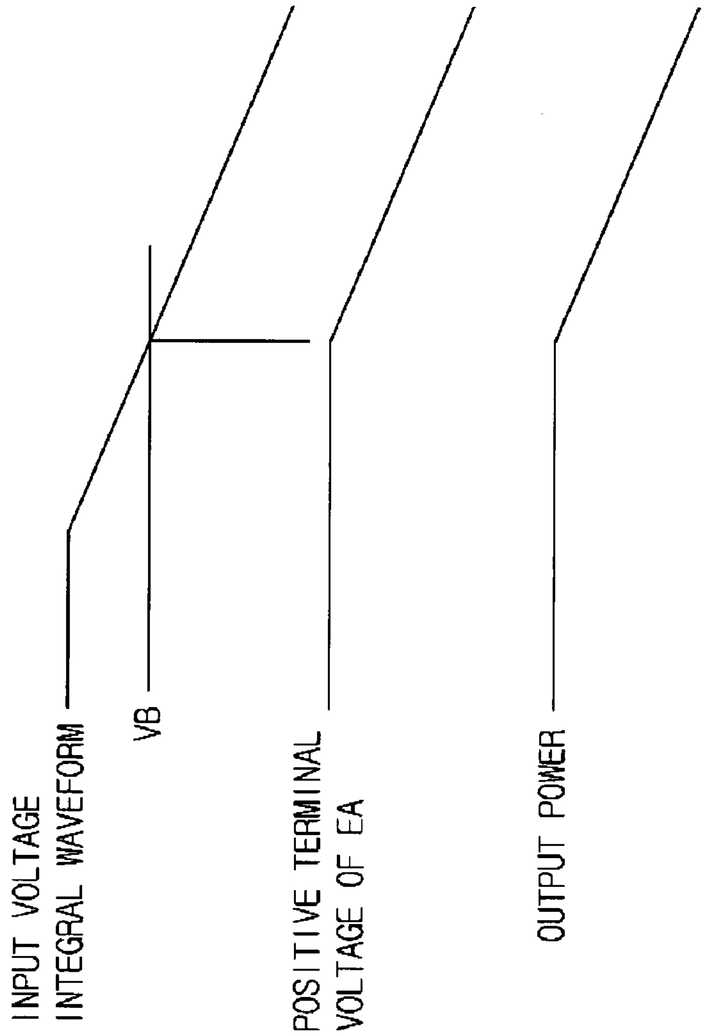
FIG. 10A a waveform chart for describing a voltage of a positive input terminal of the error amplifier in FIG. 8 and an output power corresponding thereto when an input power voltage is lowered under a prescribed level.

If an input power voltage is lowered under a prescribed level, an output voltage is gradually reduced by the line voltage detector 14, thereby preventing over-current from flowing into driving transistors. This operation may be controlled as illustrated in FIG. 10A.

If the output of the line voltage detector 14 begins to be lower than a reference voltage of the comparator 16, the output current of the comparator 16 is increased in inverse proportion to the lowered voltage. Then the output is lowered by lowering the voltage of the positive terminal of the error amplifier EA that is a feedback reference voltage.

The power supply apparatus according to the present invention controls a power by varying a pulse width and a frequency throughout the entire interval, thereby achieving a high power factor. At the same time, a constant output throughout the entire interval in which an AC input is 180 to 300 volts and a crest factor of the lamp current under 1.5 can be accomplished. Also, the power of a filament can be controlled within ±10 percent.

In other words, if a variation in an input voltage is narrow, the pulse width is mainly controlled to control the output. If a variation in an input voltage is wide, the frequency and the pulse width are controlled together according to the input voltage by widening a frequency variable range. Hence, the constant output can be maintained even for a variation in a wideband input voltage.

Figure 10B:
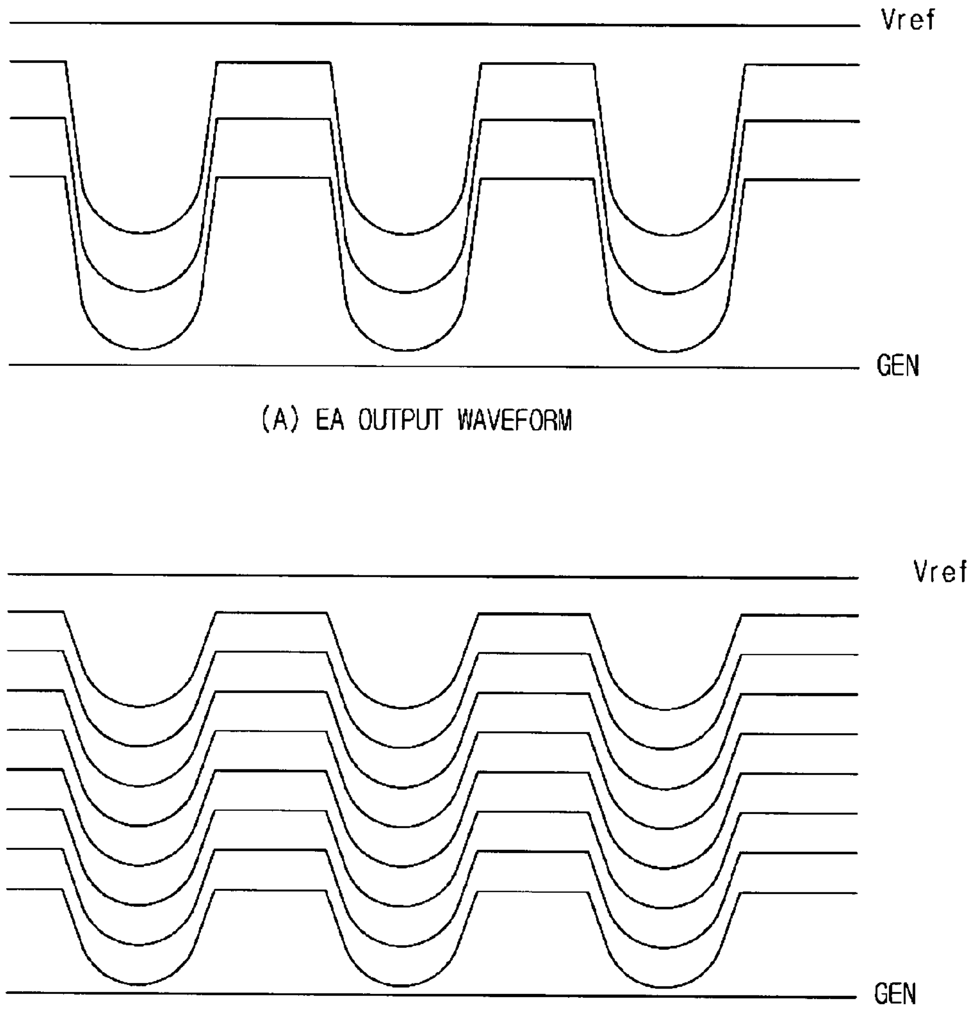
FIG. 10B is a waveform chart illustrating an output of the error amplifier corresponding to a variation in an input voltage.

The above operation is illustrated in FIG. 10B.

Referring to FIG. 10B, (A) designates an output waveform of the error amplifier EA for a narrow input voltage variable range when it is desired to control the output by mainly varying the pulse width, and (B) designates an output waveform of the error amplifier EA for a wide input voltage variable range when it is desired to control the output by increasing the frequency variable range and varying the pulse width.

Figure 11:
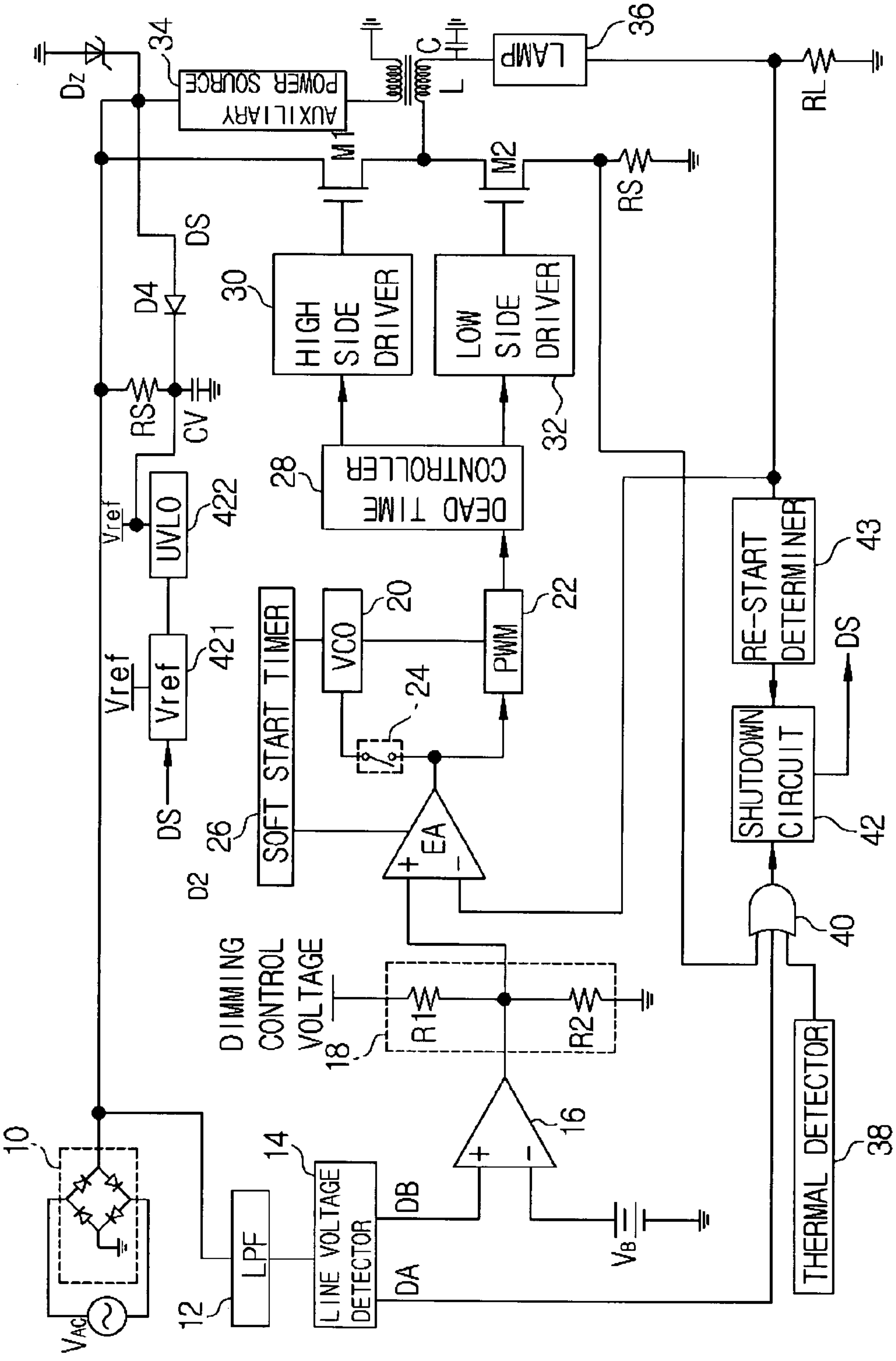
FIG. 11 is a circuit diagram a circuit diagram illustrating a power supply apparatus using a half-bridge circuit to which a dimming control voltage is applied according to still another preferred embodiment of the present invention.

The power supply apparatus according to the present invention may be applied to a dimming ballast as illustrated in FIG. 11. A dimming control voltage is supplied to the voltage divider 18, instead of the reference voltage Vref.

The output of the error amplifier EA is varied as the reference voltage thereof is changed. If the dimming control voltage is applied to the resistor R1 determining the reference voltage of the error amplifier EA, since the output current is controlled according to the applied voltage, the brightness of the lamp 36 can be adjusted.

In reducing the amount of feedback by lowering the reference voltage of the error amplifier EA in order to lower illumination, energy supplied to the filament can be efficiently limited by raising a frequency and simultaneously reducing a pulse width, compared to a method for lowering illumination by increasing only the frequency. In addition, since the amount of variation in a frequency is very small, low illumination dimming can be obtained without greatly departing from an optimal resonance condition. Therefore, the above construction is preferable to lower illumination.

Figure 12:
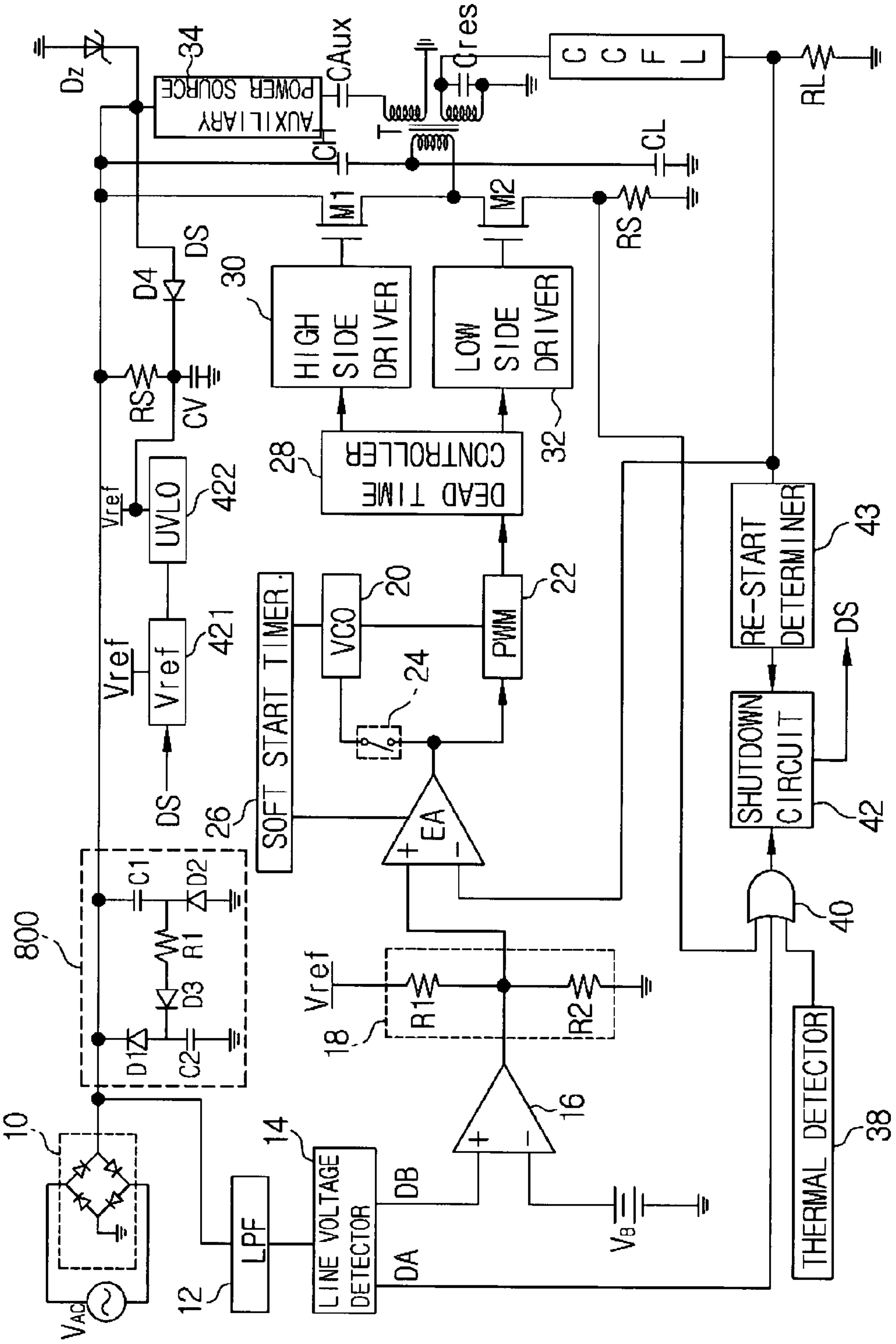
FIG. 12 is a circuit diagram illustrating a power supply apparatus using a rectifying high power factor circuit applied to a cold cathode fluorescent lamp (CCFL) inverter circuit using a simple high power factor of a rectifying type having a valley voltage according to another preferred embodiment of the present invention.

The power supply apparatus according to the present invention is applicable to a cold cathode fluorescent lamp (CCFL) inverter circuit using a simple high power factor circuit of a rectifying type having a valley voltage as illustrated in FIG. 12. The operation of the power supply apparatus illustrated in FIG. 12 is the same as the above-described embodiments. Therefore, a detailed description thereof will be omitted.

Figure 13A:
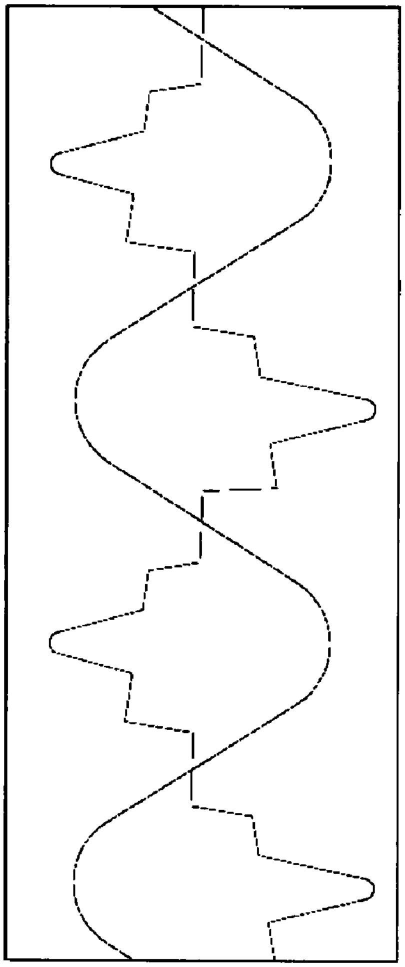
FIGS. 13A to 13C are waveform charts illustrating voltage-current characteristics of an input versus a load.
Figure 13B:
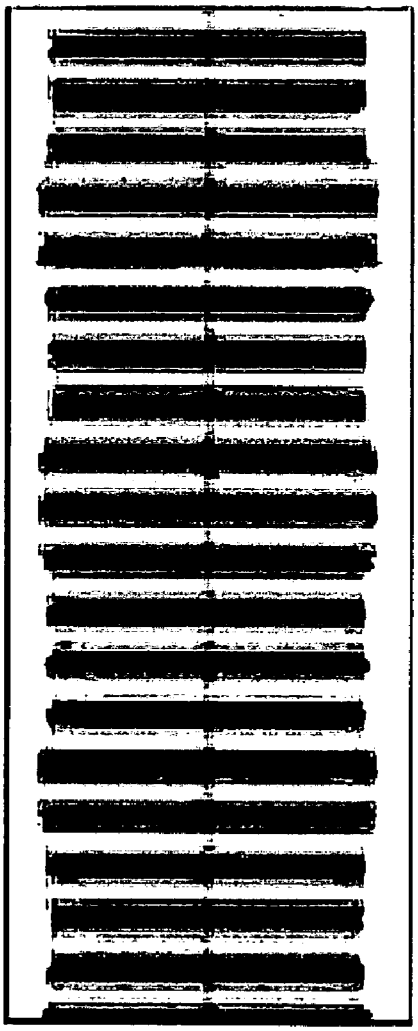
Figure 13C:
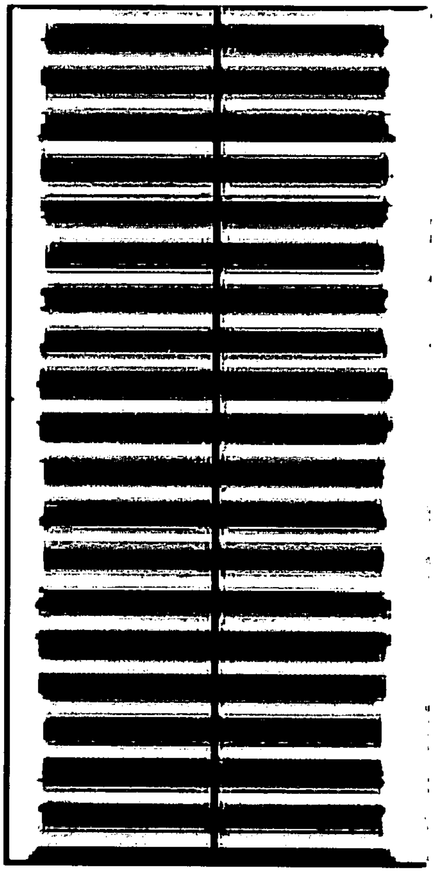

Voltage-current characteristics of an input versus a load in the above-described embodiments of the present invention are illustrated in FIGS. 13A to 13C.

FIG. 13A illustrates waveforms of an input current and an input voltage, FIG. 13B a waveform of an output voltage, and FIG. 13C a waveform of an output current. Referring to FIGS. 13A to 13C, it will be appreciated that the output voltage and current are stabilized and a high power factor and low crest factor can be achieved.

As apparent from the foregoing description, the power supply apparatus according to the present invention is applicable to a fluorescent lamp ballast and a CCFL inverter circuit of a half-bridge type. The power supply apparatus varies a frequency of a narrow band and controls a pulse width, thereby improving an output control dynamic characteristic.

Even in a high power factor rectifying circuit condition of a positive type having a valley voltage, the ballast and inverter can achieve a constant output for a wide input voltage variation and stable control with a low tube current crest factor.

Moreover, since a circuit is operated in an optimal resonance condition by achieving a very high dynamic characteristic while narrowing a frequency variable width, the light conversion efficiency of the ballast or inverter is increased. In addition, since a variation in energy flowing into the filament in a fluorescent lamp ballast is very small, the life of the tube can be extended.

If a conventional half-bridge circuit is used, a control dynamic characteristic is degraded when there are a variation in a voltage and a deviation in a tube. Then a current crest factor of the tube is deteriorated and electrostatic force is unstable. Furthermore, since a width of a frequency variation is wide, a variation in current flowing into the filament is increased, and the light conversion efficiency is lowered. In addition, since the life of the tube is greatly shortened, actual use is difficult.

The inventive technique can be used for the dimming of a fluorescent lamp or a CCFL and can control stable dimming up to very low luminance incomparable to the existing control technique.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A power supply apparatus using a half-bridge circuit for rectifying an alternative current (AC) power source and providing the rectified power source to a load, comprising:

a line voltage detecting means for detecting a voltage of an input power source provided to the load;

an error amplifying means for comparing the voltage detected from the line voltage detecting means with a reference voltage and outputting a voltage corresponding to a difference therebetween;

a pulse width modulating means for outputting a pulse having a variable width corresponding to an output level of the error amplifying means;

a dead time controlling means for outputting a first pulse corresponding to a high side and a second pulse corresponding to a low side by the pulse output from the pulse width modulating means, wherein the first and second pulses have different pulse widths and different rising and falling time points; and a driving means for driving the power source supplied to the load as a constant current state by the first and second pulses.

2. The power supply apparatus as defined in claim 1, wherein the line voltage detecting means includes:

a low pass filter for smoothing the input power source and converting the smoothed input power source into a direct current (DC) voltage; and a line voltage detector for supplying an output signal to the error amplifying means if the voltage of the low pass filter is less than a prescribed level.

3. The power supply apparatus as defined in claim 2, wherein the line voltage detector further generates an output signal having a logic value if the voltage of the low pass filter is more than a prescribed level.

4. The power supply apparatus as defined in claim 1, wherein the error amplifying means includes:

a comparator for comparing the voltage detected from the line voltage detecting means with a constant voltage;

a voltage divider for adding an output of the comparator to a divided reference voltage; and an error amplifier for comparing a voltage provided by the voltage divider with a feedback voltage of a voltage supplied to the load and outputting a signal corresponding to a difference therebetween.

5. The power supply apparatus as defined in claim 4, wherein the voltage divider receives a dimming control voltage instead of the reference voltage.

6. The power supply apparatus as defined in claim 1, further comprising a voltage controlled oscillator for providing a variable frequency corresponding to an output level of the error amplifying means to the pulse width modulating means, wherein the pulse width modulating means generates a pulse having a frequency of a signal provided by the voltage controlled oscillator and a variable pulse width corresponding to the output level of the error amplifying means.

7. The power supply apparatus as defined in claim 6, further comprising a soft start timer for controlling the voltage controlled oscillator and the error amplifying means during initial starting, controlling an output to be a high frequency and a maximum pulse width during initial power source supply, gradually lowering a frequency, and stopping an operation after a given time elapses.

8. The power supply apparatus as defined in claim 1, wherein the dead time controlling means includes:

a first delay for outputting the first pulse applying a first dead time by delaying a rising time point of an output of the pulse width modulating means by a given time; and a second delay for outputting the second pulse applying a second dead time by inverting the output of the pulse width modulating means and then delaying a falling time point of the inverted signal by a given time.

9. The power supply apparatus as defined in claim 1, wherein the driving means includes:

a high side driver for outputting a high side driving signal by the first pulse;

a low side driver for outputting a low side driving signal by the second pulse;

a first switching device for switching the high side of the AC power source supplied to the load by an output of the high side driver; and a second switching device for switching the low side of the AC power source provided to the load by an output of the low side driver.

10. The power supply apparatus as defined in claim 1, further comprising a high power factor circuit for controlling a power factor of the input power source provided to the load.

11. The power supply apparatus as defined in claim 1, wherein the load is a cold cathode fluorescent lamp (CCFL).

12. The power supply apparatus as defined in claim 9, wherein the load is a cold cathode fluorescent lamp (CCFL).

* * * * *